H. E. BLOOD
VARIABLE SPEED GEARING.
APPLICATION FILED MAR. 9, 1914.
1,154,365.  Patented Sept. 21, 1915.
3 SHEETS—SHEET 1.
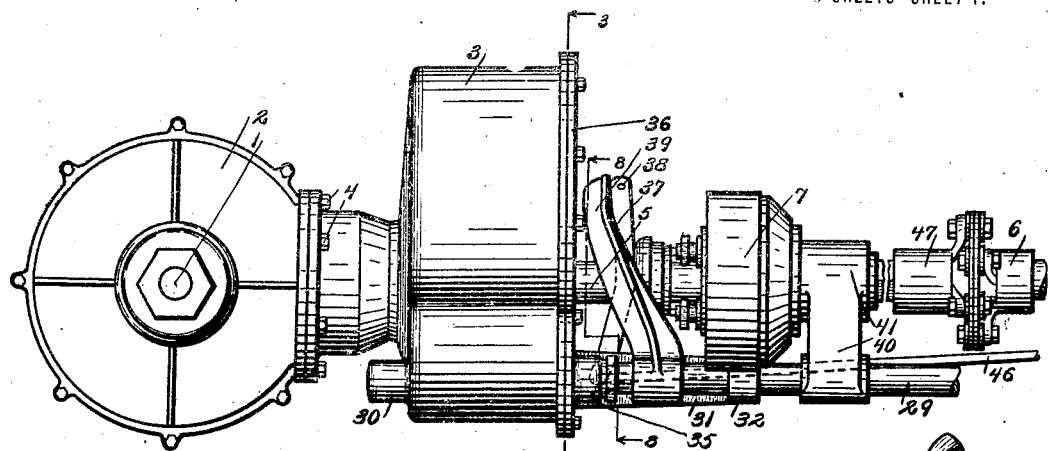
Fig. I.
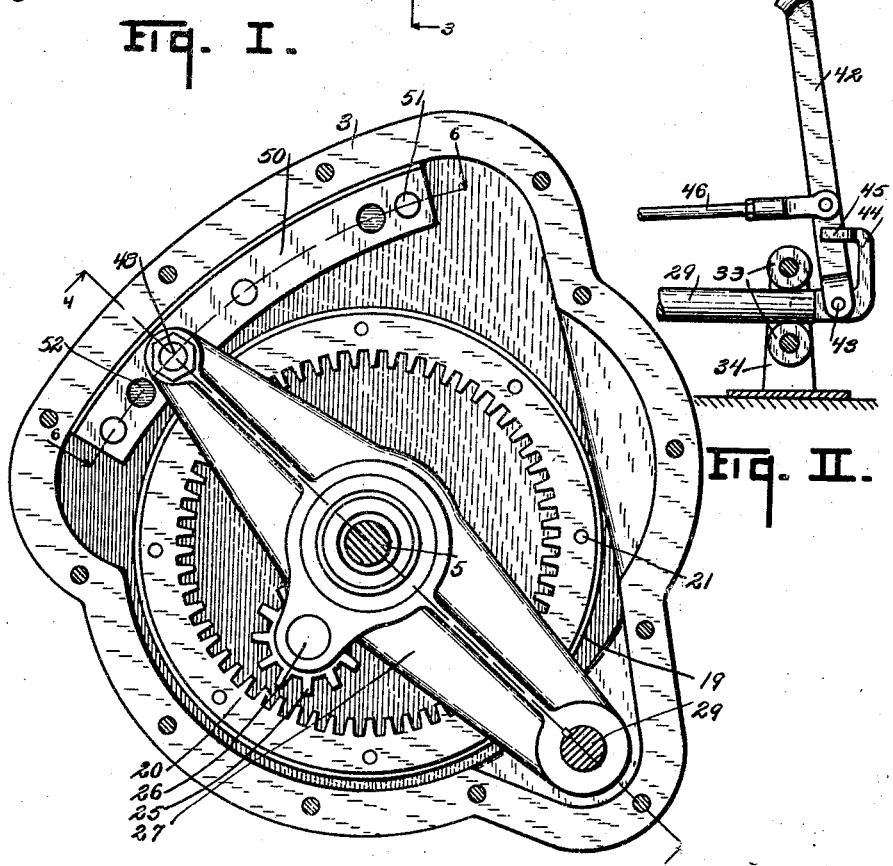
Fig. II.
Fig. III.
Witnesses  Inventor
Howard E. Blood
By Chappell & Earl

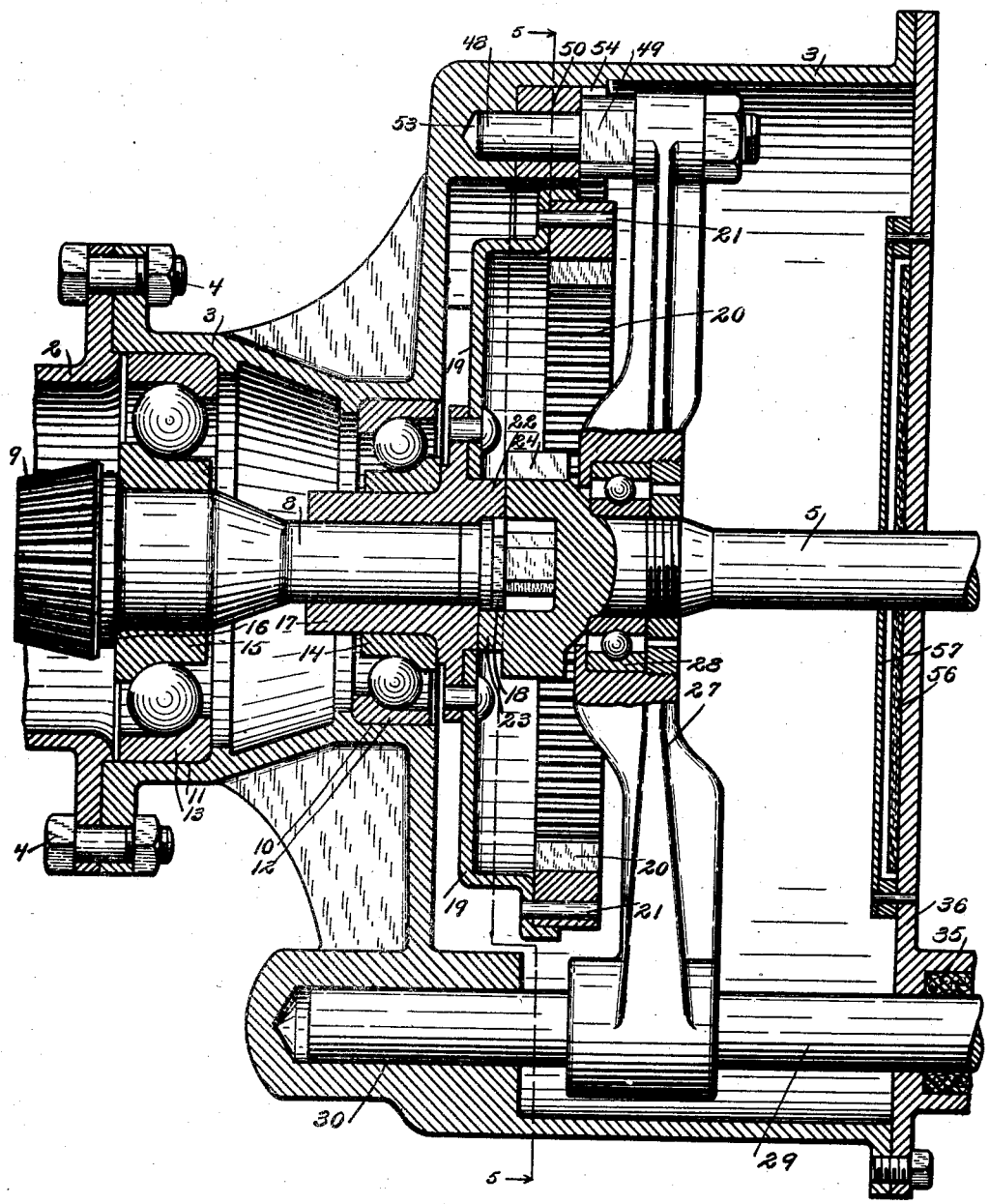

H. E. BLOOD.
VARIABLE SPEED GEARING.
APPLICATION FILED MAR. 9, 1914.
1,154,365.
Patented Sept. 21, 1915.
3 SHEETS—SHEET 3.
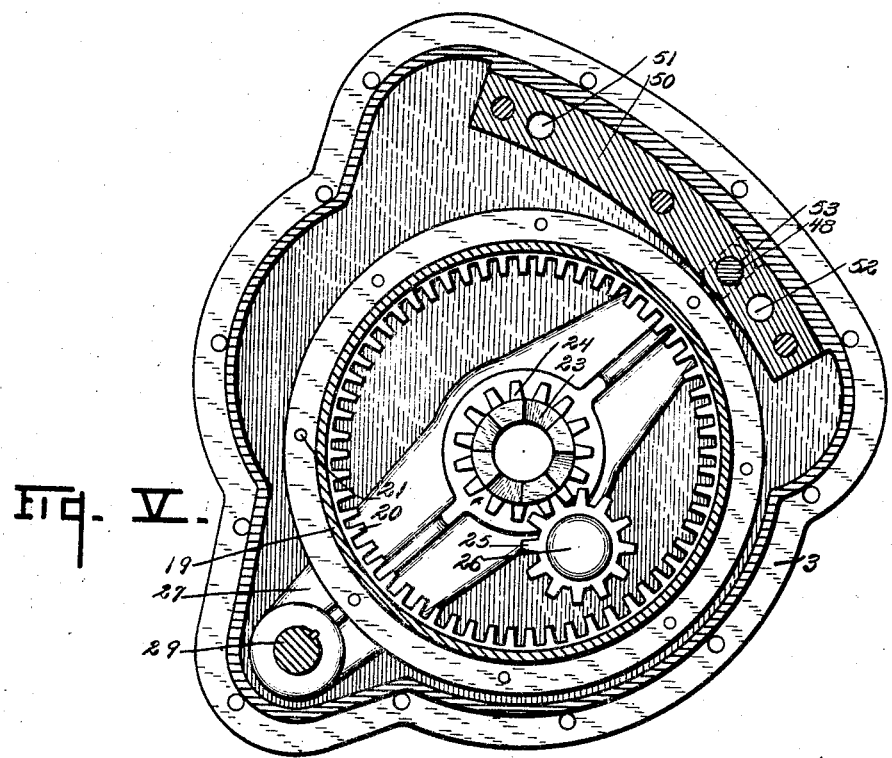
Fig. V.
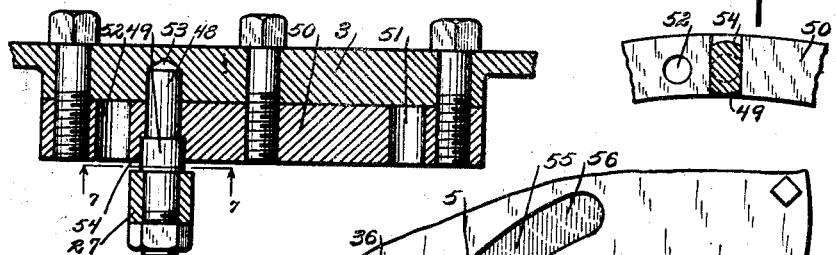
Fig. VI.
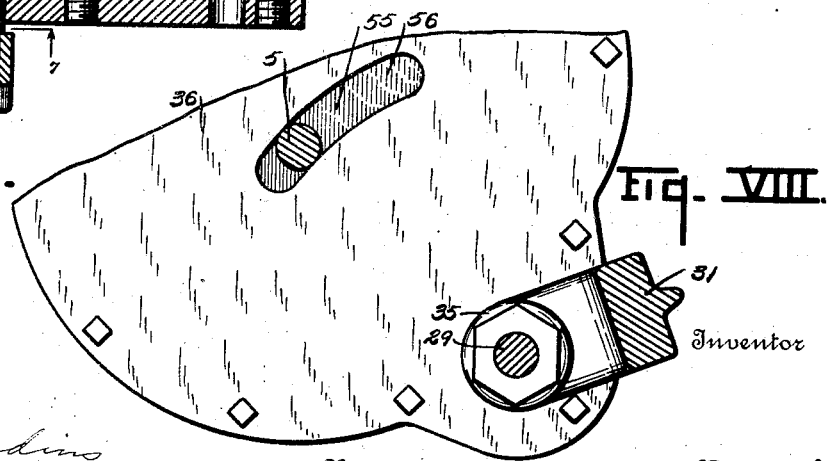
Fig. VII.
Fig. VIII.
Witnesses
Inventor
Howard E. Blood
By Chappell & Earl Attorney

UNITED STATES PATENT OFFICE.

HOWARD E. BLOOD, OF KALAMAZOO, MICHIGAN.

VARIABLE-SPEED GEARING.

1,154,365.

Specification of Letters Patent. Patented Sept. 21, 1915.

Application filed March 9, 1914. Serial No. 823,291.

*To all whom it may concern:*

Be it known that I, HOWARD E. BLOOD, a citizen of the United States, residing at Kalamazoo, Michigan, have invented certain new and useful Improvements in Variable-Speed Gearing, of which the following is a specification.

This invention relates to improvements in variable speed gearing.

My improved variable speed gearing is especially designed by me for use in motor vehicles, particularly of the lighter or cycle car type, where light and compact transmission gearings are especially desirable, and I have shown the same as I have embodied it for use in such a structure. My improvements are, however, readily adapted for and embodied for use in other relations.

The main objects of this invention are: First: to provide an improved transmission gearing which is simple and compact in structure and comparatively light in weight. Second: to provide an improved transmission gearing having these advantages in which the gears are brought into mesh with a sliding or axial movement. Third: to provide an improved transmission gearing which is very easily adjusted or controlled.

Further objects, and objects relating to structural details will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing forming a part of this specification, in which:

Figure I is a detail side elevation of a structure embodying the features of my invention, parts of the driving member being broken away, the forward ends of the control shaft and the driving member, control and clutch actuating link being broken away. Fig. II is a detail vertical section showing the forward end of the control shaft and its actuating lever, and the control clutch link connected thereto, the support for the control shaft being shown in vertical section. Fig. III is a detail transverse section on a line corresponding to line 3—3 of Fig. I. Fig. IV is an enlarged detail view, partially in section, on a line corresponding to line 4—4 of Fig. III. Fig. V is a detail view, partially in transverse section, on a line corresponding to the broken line 5—5 of Fig. IV. Fig. VI is a detail view, partially in section, on curved line 6—6 of Fig. III. Fig. VII is a detail section on a line corresponding to line 7—7 of Fig. VI. Fig. VIII is a detail transverse section on a line corresponding to the broken line 8—8 of Fig. I.

In the drawing similar reference characters refer to similar parts throughout the several views, and the sectional views are taken looking in the direction of the little arrows at the end of the section lines.

Referring to the drawing, 1 represents the rear or driving axle of a motor vehicle. On this axle is a gear casing 2 for the axle gear. The transmission gearing casing 3 is secured to this gear casing 2 by the bolts 4. The driving shaft 5 is provided with a universal joint 6, the details of the joint not being here illustrated. The driving shaft is also provided with a control clutch 7, the details of the clutch not being herein illustrated as they form no part of my present invention. The driven shaft 8 is provided with a beveled gear 9 meshing with the gear on the axle, not shown.

The transmission gearing casing is provided with bearings for the driven shaft, ball bearings being provided in the structure illustrated.

For convenience in assembling the casing is provided with seats 10 and 11 for the outer bearing cones 12 and 13 respectively. The inner cones 14 and 15 are secured to the driven shaft. The shaft is shouldered at 16 to engage the cone 15, while the inner cone 14 is carried by the gear hub 17, which is engaged by the nut 18 for retaining the parts together.

The hub 17 carries the web 19 of the internal gear 20, the web being flanged to receive the gear which is secured thereto by the rivets or pins 21. The hub is also provided with a jaw clutch member 22 which coacts with the clutch member 23 on the driving member 5, thus securing the direct drive or high speed connection for the transmission.

The driving shaft 5 is provided with a gear 24 adapted to be brought into mesh with the internal gear 20 to secure the low speed. A gear 25 is carried by the stub shaft 26 on the arm or support 27 for the shaft 5. Gear 25 is in mesh with the gear 24 so that when the gear 25 is brought into mesh with the internal gear a reverse drive is secured.

The arm or shaft support 27 is provided with a bearing 28 for the shaft member 5. The arm 27 is carried by the control shaft 29 which is supported for rotative and longitudinal movement. The casing is provided with a bearing 30 and also with a forwardly projecting arm 31 having a bearing 32 thereon for the control shaft. The forward end of the control shaft is disposed between rollers 33 on the supports 34.

A packing gland 35 is provided on the casing face plate 36 for the control shaft.

The releasing lever 37 for the control clutch 7 is pivotally mounted at 38 on the arm 39 carried by the control shaft so that it moves longitudinally with the shaft, the lever being carried with the arm. The connections for the lever to the clutch through the shafting collar 7' on the shaft member 5 are not shown in detail as suitable means are well known in the art and they form no part of my present invention. The shaft 29 is also provided with an arm 40 having a bearing 41 thereon for the outer end of the shaft member 5. This bearing is disposed on the outer side of the clutch 7. (The control clutch is automatically engaged by springs forming part of the clutch, not shown.) This arrangement of parts keeps them in proper alinement as the gears are shifted.

The actuating lever 42 is pivoted at 43 on the forward end of the control shaft 29. The control shaft 29 is provided with an upwardly projecting arm 44 forked at 45 to embrace the actuating lever so that the arm serves as a stop limiting the forward movement of the lever independently of the control shaft, the arm also constituting a connection for rotating the control shaft.

The clutch releasing lever 37 is connected by the link 46 to the lever 42. The lever 42 is normally out of contact with the stop arm 44 so that on actuating the lever 42, the lever has a limited movement prior to engaging the arm. This initial movement releases the control clutch. The continued movement of the actuating lever moves the control shaft longitudinally and through it the shaft 5. The socket 47 of the universal joint 6 has a slip connection with the shaft so as to permit this longitudinal movement. As joints or connections of this character are well understood the details are not illustrated here.

The arm 27 is provided with a locking pin 48 having a shoulder-like stop thereon. The keeper 50 is provided with holes 51, 52 and 53 adapted to receive the locking pin when it is brought into alinement therewith, permitting the longitudinal movement of the driving member to engage or disengage the clutch or to bring either the gear 24 or the gear 25 into mesh with the internal gear after they have been swung into alinement therewith.

The stop 49 limits the longitudinal movement when the locking pin is engaged in either of the holes 51 or 52 so that the clutch member 23 is not permitted to engage. When the locking pin enters the hole 53, which is enlarged at 54, the stop enters the enlargement, thus permitting the clutch members to engage. The locking pin coacting with the keeper member prevents the engaging of the gears except as they are moved axially, that is, the gears are engaged by a sliding action as distinguished from a swinging action, so that all the advantages of a sliding gear transmission are retained so far as the matter of shifting the gears is concerned.

The face plate 36 of the casing has a segmental slot 55 therein permitting the swinging of the shaft 5 laterally. On the shaft is a closure disk 56. This disk swings with the shaft. The retaining plate 57 for the closure disk is mounted on the inner side of the face plate in a spaced relation thereto so as to properly support the closure disk, the retaining plate being provided with a slot corresponding to the slot 55.

With this arrangement of parts I secure a transmission having two speeds and reverse and employ only three gears on the transmission proper.

The structure is very compact and may be made very light in weight, thereby particularly adapting it for motor vehicles of light cycle car type for which I have especially designed the same. The gears are brought into and out of mesh with a sliding action which is a very desirable feature in a structure of this character. The parts are so arranged that they can be very conveniently manipulated, as has been described.

I have illustrated and described my improvements in detail in the form in which I have embodied the same in practice. I have not attempted to illustrate or describe certain modifications or adaptations which I contemplate, as the disclosure made will enable those skilled in the art to which this invention relates, to embody or adapt the same as conditions may require. I desire, however, to be understood as claiming my improvements specifically in the form illustrated as well as broadly within the scope of the appended claims.

Having thus described my invention, what I claim as new and desire to secure by Letters Patent, is:

1. In a gearing, the combination of driving and driven shaft members, a control shaft supported for rotative and longitudinal adjustment, an arm on said control shaft supporting said driving shaft for longitudinal and lateral adjustment, coacting gears on said driving and driven members, a control clutch for the driving member, a second arm on said control shaft, a control clutch shifting lever pivotally mounted on said arm, an actuating lever pivotally mounted on said control shaft, said control shaft being provided with an arm constituting a stop and support for said actuating lever, and a link connecting said actuating lever to said shifting lever, the control clutch being released by the movement of the actuating lever prior to its engagement with said stop arm, said control shaft being shifted longitudinally by the continued movement of said actuating lever.

2. In a gearing, the combination of driving and driven shaft members, a control shaft supported for rotative and longitudinal adjustment, an arm on said control shaft supporting said driving shaft for longitudinal and lateral adjustment, coacting gears on said driving and driven members, a control clutch for the driving member, an actuating lever pivotally mounted on said control shaft, said control shaft being provided with an arm constituting a stop and support for said actuating lever, and connections from said actuating lever to said control clutch whereby the control clutch is released by the initial movement of the actuating lever prior to its engagement with said stop arm, said control shaft being shifted longitudinally by the continued movement of said actuating lever.

3. In a gearing, the combination of driving and driven shaft members, coacting clutch members on said shaft members, a casing provided with a bearing for said driven member, a control shaft supported for rotative and longitudinal movement, said casing being provided with a bearing for the inner end of said control shaft and having a forwardly projecting arm thereon provided with a second bearing for said control shaft, bearing rollers for the outer end of said control shaft, an arm on said control shaft supporting said driving member for lateral and longitudinal adjustment, an internal gear on said driven member, a gear on said driving member, a gear carried by said arm meshing with said gear on said driving member, a locking member on said arm, a coacting keeper member, a control clutch for said driving member, an arm on said control shaft provided with a bearing for said driving member disposed on the outer side of said control clutch, an actuating lever for said control shaft, and connections from said lever to said control clutch whereby the control clutch is released during the initial movement of the actuating lever and the control shaft actuated by the continued movement thereof.

4. In a gearing, the combination of driving and driven shaft members, coacting clutch members on said shaft members, a control shaft supported for rotative and longitudinal movement, an arm on said control shaft supporting said driving member for longitudinal and lateral adjustment, an internal gear on said driven member, a gear on said driving member, a gear carried by said arm meshing with said gear on said driving member, a locking member on said arm, a coacting keeper member, a control clutch for said driving member, an actuating lever for said control shaft and connections from said actuating lever to said control clutch whereby the control clutch is released during the initial movement of the actuating lever and the control shaft actuated by the continued movement thereof.

5. In a gearing, the combination of driving and driven members, coacting clutch members on said shaft members, a casing provided with a bearing for said driven member, a control shaft supported for rotative and longitudinal movement, said casing being provided with a bearing for the inner end of said control shaft and having a forwardly projecting arm thereon provided with a second bearing for said control shaft, bearing rollers for the outer end of said control shaft, an arm on said control shaft supporting said driving member for longitudinal and lateral adjustment, an internal gear on said driven member, a gear on said driving member, a gear carried by said arm meshing with said gear on said driving member, a locking member on said arm, a coacting keeper member, an arm on said control shaft provided with a bearing for said driving member disposed on the outer side of said control clutch, an actuating lever for said control shaft and connections from said actuating lever to said control clutch whereby the control clutch is released during the initial movement of the actuating lever and the control shaft actuated by the continued movement thereof.

6. In a gearing, the combination of driving and driven shaft members, coacting clutch members on said shaft members, a control shaft supported for rotative and longitudinal movement, an arm on said control shaft supporting said driving member for lateral and longitudinal adjustment, said clutch members being engaged and disengaged by the longitudinal adjustment of said driving shaft member, an internal gear on said driven member, a gear on said driving member, a gear carried by said arm meshing with said gear on said driving member, a locking member on said arm, a coacting keeper member, and means for adjusting said control shaft longtitudinally and rotatively.

7. In a gearing, the combination of driving and driven shaft members, one of said shaft members being adjustable laterally and longitudinally, a casing provided with a bearing for the other shaft member, a control shaft supported for rotative and longitudinal adjustment, said casing being provided with a bearing for the inner end of said control shaft, a support for said adjustable shaft member carried by said control shaft, coacting gears on said shaft members, a control clutch for the driving shaft member, a shifting lever for said control clutch, an arm on said control shaft on which shifting lever is pivotally mounted, an actuating lever for said control shaft and a connection from said actuating lever to said clutch shifting lever, whereby the clutch is released during the initial movement of the actuating lever and the control shaft actuated to shift the gears by the continued movement thereof.

8. In a gearing, the combination of driving and driven shaft members, one of said shaft members being adjustable laterally and longitudinally, a casing provided with a bearing for the other shaft member, a control shaft disposed parallel with said driving shaft and supported for rotative and longitudinal adjustment, said casing being provided with a bearing for the inner end of said control shaft, a support for said adjustable shaft member carried by said control shaft, coacting gears on said driving and driven shaft members, and an actuating lever for said control shaft.

9. In a gearing, the combination of driving and driven shaft members, one of said shaft members being adjustable laterally and longitudinally, the other being relatively fixed, a clutch for said shaft members, a control shaft supported for rotative and longitudinal adjustment, a support for said adjustable shaft member carried by said control shaft, an internal gear on the relatively fixed shaft member, a gear on said adjustable shaft member, a gear carried by said adjustable shaft member support meshing with said gear on said adjustable shaft member, a locking pin on said support shouldered to provide a stop portion limiting the longitudinal movement of the adjustable shaft member in one direction, a coacting keeper member having holes adapted to receive said pin, one of the holes being adapted to receive the stop portion of the pin thereby permitting engagement of the shaft member clutch, an actuating lever for said control shaft, a control clutch, and connections from said actuating lever to said control clutch whereby the control clutch is released during the initial longitudinal movement of the actuating lever and the control shaft is shifted longitudinally by the continued movement thereof, said control shaft being adapted for rotative movement in its retractive position, said locking pin and keeper coacting to prevent an engagement of the gears except when moved axially.

10. In a gearing, the combination of driving and driven shaft members, one of said shaft members being laterally and longitudinally adjustable, the other being relatively fixed, a clutch for said shaft members, a control shaft supported for rotative and longitudinal movement, a support for said adjustable shaft member carried by said control shaft, an internal gear on the relatively fixed shaft member, a gear on said adjustable shaft member, a gear carried by said support on said control shaft meshing with said gear on said adjustable shaft member, a locking pin on said support shouldered to provide a stop, a coacting keeper member having holes adapted to receive said pin, one of the holes being adapted to receive the stop portion of the pin, thereby permitting engagement of the said clutch for said driving and driven members, and means for actuating said control shaft.

11. In a gearing, the combination of driving and driven shaft members, one of said members being laterally and longitudinally adjustable, a control shaft disposed parallel with said driving shaft member and supported for rotative and longitudinal movement, a support for said adjustable shaft member carried by said control shaft, coacting gears on said driving and driven members, a locking member on said support, a coacting keeper member, and a control clutch for said driving member, said locking member and keeper coacting to prevent the engagement of the gears except when moved axially.

12. In a gearing, the combination of driving and driven shaft members, one of said members being laterally and longitudinally adjustable, a control shaft supported for rotative and longitudinal movement parallel with said shaft members, a support for said adjustable shaft member carried by said control shaft, coacting gears on said driving and driven members, and actuating means for said control shaft whereby it may be adjusted longitudinally and rotatively, for the purpose specified.

13. In a gearing, the combination of driving and driven shaft members, one of said shaft members being laterally and longitudinally adjustable, the other being relatively fixed, a casing provided with a bearing for said relatively fixed shaft member, a face plate for said casing slotted to receive said adjustable shaft member, a closure disk mounted on said adjustable shaft member, a retaining plate disposed on the inner side of said face plate over said closure disk and slotted to receive said adjustable shaft member, an adjustable support for said adjustable shaft member, coacting gears on said driving and driven shaft members, and means for actuating said support whereby said driving shaft member may be moved longitudinally and laterally to engage and disengage the gears with an axial movement thereof.

14. In a gearing, the combination of driving and driven shaft members, coacting clutch members on said driving and driven members, a control shaft supported for rotative and longitudinal movement, an arm on said control shaft supporting said driving member for lateral and longitudinal adjustment, an internal gear on said driven member, a gear on said driving member, a gear carried by said arm on said control shaft meshing with said gear on said driving member, means for retaining said arm in its adjusted positions being adapted to prevent the meshing of the gears except by axial movement thereof, a control clutch for said driving member, and means for actuating said control shaft and control clutch whereby the control clutch is released during the initial movement of said actuating means and the control shaft may be shifted longitudinally and rocked by the continued movement thereof.

15. In a gearing, the combination of driving and driven shaft members, coacting clutch members on said driving and driven members, a control shaft supported for rotative and longitudinal movement, an arm on said control shaft supporting said driving member for lateral and longitudinal adjustment, an internal gear on said driven member, a gear on said driving member, a gear carried by said arm on said control shaft meshing with said gear on said driving member, means for retaining said arm in its adjusted positions said means being adapted to prevent the meshing of the gears except by axial movement thereof, and means for actuating said control shaft.

16. In a gearing, the combination of driving and driven shaft members, coacting clutch members on said driving and driven members, a control shaft supported for rotative and longitudinal movement, an arm on said control shaft supporting said driving member for lateral and longitudinal adjustment, an internal gear on said driven member, a gear on said driving member, a gear carried by said arm on said control shaft meshing with said gear on said driving member, a control clutch for said driving member, and means for actuating said control shaft and control clutch, whereby the control clutch is released during the initial movement of said actuating means and the control shaft may be shifted longitudinally and rocked by the continued movement thereof.

17. In a gearing, the combination of driving and driven shaft members, coacting clutch members on said driving and driven members, a control shaft supported for rotative and longitudinal movement, an arm on said control shaft supporting said driving member for lateral and longitudinal adjustment, an internal gear on said driven member, a gear on said driving member, a gear carried by said arm on said control shaft meshing with said gear on said driving member, and means for adjusting said control shaft longitudinally and rotatively to engage and disengage said clutch and to mesh said gears.

18. In a gearing, the combination of driving and driven shaft members, coacting clutch members on said driving and driven members, a support for said driving member whereby it is supported for lateral and longitudinal adjustment, an internal gear on said driven member, a gear fixed to said driving member to be shifted longitudinally and laterally therewith, a gear carried by said support meshing with said gear on said driving member, and means for actuating said support whereby said driving member may be moved longitudinally to engage and disengage said clutch members and longitudinally and laterally to engage or disengage said gears with an axial movement thereof.

19. In a gearing, the combination of driving and driven shaft members, a support for said driving member whereby it is supported for lateral and longitudinal adjustment, an internal gear on said driven member, a gear fixed to said driving member to be shifted longitudinally and laterally therewith, a gear carried by said support meshing with said gear on said driving member, and means for actuating said support whereby said driving member may be moved longitudinally and laterally to engage or disengage said gears with an axial movement thereof.

20. In a gearing, the combination of driving and driven shaft members, a casing provided with a bearing for one of said members, an adjustable support for the other member within said casing whereby it may be adjusted longitudinally and laterally, an internal gear on said member supported in the bearing on said casing, a gear fixed to said adjustable shaft member to be shifted longitudinally and laterally therewith, a gear carried by said support meshing with said gear on said adjustable shaft member, coacting clutch members on said driving and driven members, means for adjusting said adjustable member longitudinally and laterally whereby the said clutch members may be disengaged and the adjustable member shifted laterally to bring one of the gears into alinement with the internal gear and then shifted longitudinally to engage the same.

21. In a gearing, the combination of driving and driven shaft members, a casing provided with a bearing for one of said shaft members, the other shaft member being supported within said casing for longitudinal and lateral adjustment, an internal gear on said member supported in the bearing on said casing, a gear fixed to said adjustable shaft member to be shifted longitudinally and laterally therewith, a gear meshing with said gear on said adjustable shaft member and movable therewith, and means for adjusting said adjustable member longitudinally and laterally.

In witness whereof, I have hereunto set my hand and seal in the presence of two witnesses.

HOWARD E. BLOOD. [L. S.]

Witnesses:
LILLIAN F. SCHEID,
HARVEY STEWART.